Patented Nov. 30, 1948

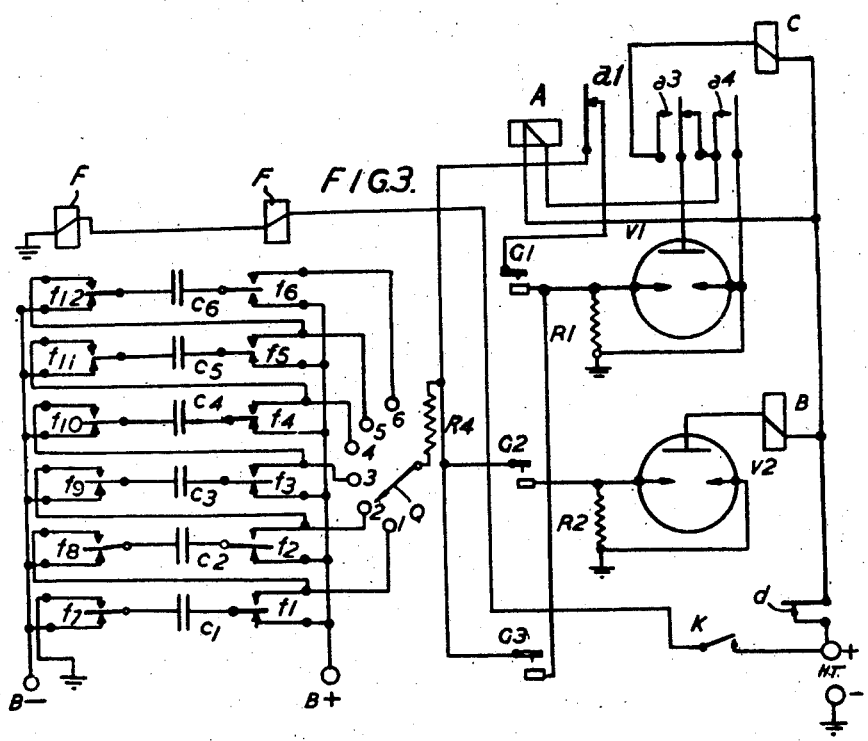

2,454,763

UNITED STATES PATENT OFFICE 2,454,763

ELECTRICAL SYSTEM FOR GAUGING A DIMENSION BY THE WIDTH OF A SPARK GAP

Herbert Stephens Bishop, London, England, assignor, by mesne assignments, to International Standard Electric Corporation, New York, N. Y., a corporation of Delaware Application May 23, 1944, Serial No. 536,951
In Great Britain June 1, 1943

13 Claims. (Cl. 177—311)

The present invention relates to electrical gauging systems with particular reference to checking the dimensions of manufactured piece-parts.

It is a very common requirement that some dimension of a manufactured piece-part, such as the thickness of a metal disc, for example, shall lie between two limits, which may be rather close. When piece-parts are made in large quantities it is desirable that the testing means should be simple, and the system might be required to include automatic means for dividing the tested parts into groups for separate collection according to the results of the tests.

The present specification describes examples of such testing arrangements which depend for their operation on the passage of electric sparks across gaps whose widths are determined by the dimension to be gauged and by the permissible limits of this dimension. The gaps which break down depend on the relation of the dimension to the limits, as will presently be explained, and corresponding combinations of relays may be operated which can be arranged to control the means for sorting the tested piece-parts into the separate groups.

The invention in its broadest aspect, however, provides an electrical system for comparing a physical dimension of an article with a standard physical dimension comprising two spark gaps, means for setting the lengths of the said gaps respectively in accordance with the said dimensions, means for applying a sparking voltage simultaneously to the said gaps, and means for indicating the particular gap across which the spark passes.

Two embodiments of the invention will be described with reference to Figs. 1 and 2 of the drawing.

Figs. 1 and 3 show schematic circuit diagrams of the two embodiments; and

Figure 1:
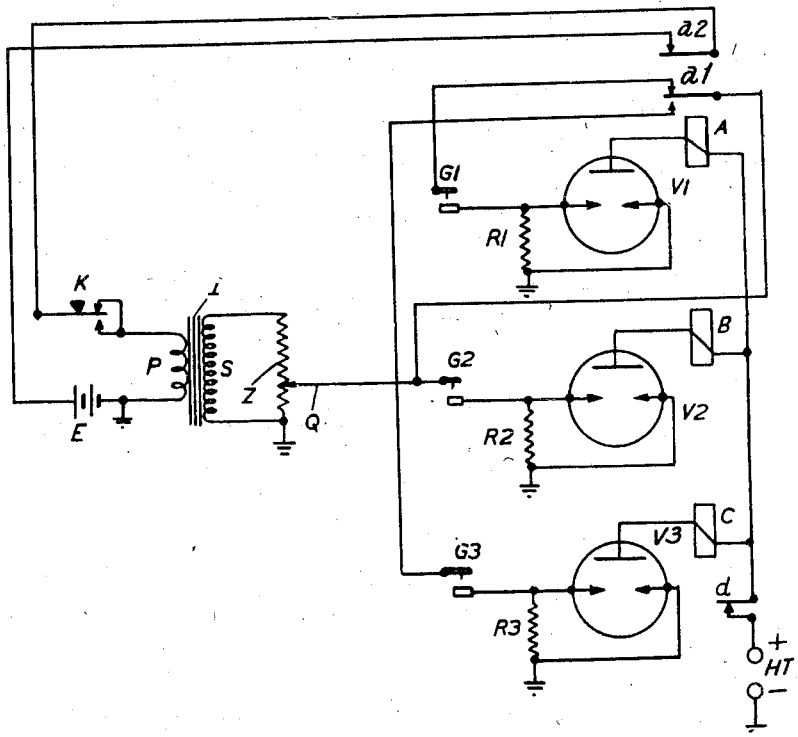

In Fig. 1 are shown three spark-gaps $G_1$, $G_2$ and $G_3$. Of these $G_2$ corresponds to the piece-part to be tested, and its length is determined by the thickness or other dimension which is to be tested, but varies in the opposite sense, as will be explained more fully later. The lengths of $G_1$ and $G_3$ are fixed, and are the same as that of $G_2$ when the dimension of the piece-part is equal to the maximum and minimum limit respectively.

Three similar cold cathode trigger gas-filled valves $V_1$, $V_2$ and $V_3$ are provided, the cathodes of which are connected to earth, and the anodes to the positive terminal of the high tension source HT through individual relays A, B and C. The trigger electrode of each valve is connected to the corresponding cathode through one of the equal resistances $R_1$, $R_2$ or $R_3$ and also to the lower terminal of the corresponding spark-gap $G_1$, $G_2$ or $G_3$.

The induction coil or spark-coil I has a low tension winding P connected in a local circuit to a battery E, or other like direct current source, through a break contact key K and a normally closed pair of contacts $a2$ controlled by the relay A. The high tension winding S of the coil I is connected to a high resistance Z having an adjustable tapping contact Q which is connected to the upper terminal of the spark-gap $G_2$. A set of change-over contacts $a1$, controlled by the relay A, in its normal position connects the contact Q also to the upper terminal of $G_1$. The lower end of the resistance Z is connected to earth as indicated.

Let it be assumed that the piece-part to be tested is within the prescribed limits. Then the gap $G_1$ which corresponds to the maximum limit, will be smaller than $G_2$, as already explained. The key K is pressed, momentarily disconnecting the source E. This will induce a high voltage in the high tension winding S, of which a fraction is applied simultaneously to the gaps $G_1$ and $G_2$. Since $G_1$ is smaller than $G_2$, it will break down first and a very small current will flow, which however prevents the voltage from rising sufficiently to break down the gap $G_2$. A momentary voltage is thus applied to the trigger electrode of $V_1$, and the winding S should be poled so that this voltage is positive. By suitably adjusting the contact Q, this voltage may be made to fire the valve $V_1$, and the anode current which flows then operates the relay A. The effect of this is first to change over the contacts $a1$ substituting the spark-gap $G_3$ for $G_1$, and afterwards to open contacts $a2$, so producing a second spark. Since now the gap $G_2$ is smaller than $G_3$, the valve $V_2$ will be fired and relay B will be operated. Thus relay A and then B will be operated if the piece-part is within the prescribed limits. It will be evident that the contacts $a1$ and $a2$ should be so adjusted that $a2$ does not open until the change-over of $a1$ is completed.

The key K is provided with an additional make contact, as shown, which should be adjusted so that on operation of the key, the circuit is only opened for a small fraction of a second, in order that the circuit may be closed again in time for the second spark.

Now suppose that the piece-part dimension is too large. Immediately after operating the key K the first spark will occur at $G_2$ instead of $G_1$, because $G_2$ is now the shorter gap. This will fire the valve $V_2$ instead of $V_1$ and will operate relay B only, and the second test does not take place at all.

If the piece-part is too small, the first test takes place as described, but on the occurrence of the second spark, the valve $V_3$ is fired instead of $V_2$ since the gap $G_3$ will be smaller than $G_2$, so that relay C will be operated instead of B.

It will thus be seen that the relays A, B and C will be selectively operated according to the size of the piece-part as follows:

| Piece-part Dimension | Relays Operated |
|---|---|
| Correct | A, B |
| Too large | B |
| Too small | A, C |

The relays A, B and C can evidently be provided with contacts (not shown) which may be arranged to control means for sorting the piece-parts into three groups according to the result of the test. If this is not required, they may operate lamps or other signals to inform an operator instead.

It will be necessary to provide means for extinguishing the valves and releasing the relays after each piece-part has been tested. For this purpose a pair of break contacts $d$ has been shown connected in series with the high tension source.

It has been found that a spark coil of the kind commonly used for ignition of petrol engines is suitable for the coil I, the source E being a 4 volt battery, for example; a value found suitable for the resistance Z was about 17 megohms, the contact Q being at a point about 5 megohms from the earthed end. The valves were of a type requiring an anode voltage of about 130, the firing voltage on the trigger electrode being about 70 volts. The resistances $R_1$, $R_2$ and $R_3$ were therefore chosen so that this voltage is not much exceeded when a spark passes. It will be evident that any other kind of trigger valves, or equivalent trigger circuits not requiring any appreciable power for switching them may be employed instead of cold cathode valves. For example, gas-filled valves with the usual heated cathodes would do. Any such valves or circuits will be generally referred to as "electron valves."

Fig. 3 shows a modification of Fig. 1 in which only two trigger valves are used instead of three, and in which a different method of generating the sparks is employed. It will be noted that in Fig. 1 the valves $V_1$ and $V_3$ are never simultaneously used, so that by providing the relay A with suitable additional contacts the valve $V_1$ may be switched into the position of $V_3$ for the second test. Thus in Fig. 3 the lower contacts of the spark-gaps $G_1$ and $G_3$ are both connected to the trigger electrode of $V_1$, and a set of contacts $a3$ controlled by relay A switches the anode of the valve $V_1$ from the winding of relay A to that of relay C. An additional set of make contacts $a4$ provides means for locking the relay A after it has been operated by the firing of $V_1$.

The upper contacts of the gaps $G_2$ and $G_3$ are connected together, and break contacts $a1$ controlled by relay A are provided for disconnecting the gap $G_1$ after it has fired the valve $V_1$. This is slightly simpler than the corresponding arrangement shown in Fig. 1.

An alternative arrangement for generating the spark is shown in Fig. 3. In this arrangement, a relay F operated by a key K, or like device, controls twelve sets of change-over contacts $f_1$ to $f_{12}$ connected to six equal condensers $C_1$ to $C_6$. When the relay F is not operated, all the condensers are connected in parallel to a battery or other source of constant potential at the terminals B+ and B—. On the operation of relay F, the left-hand terminal of $C_1$ is connected to ground and all the condensers are connected in series. A potentiometer switch Q has six studs connected respectively to the right-hand terminals of the condensers through the contacts $f_1$ to $f_6$ under this condition. Thus by adjusting the movable contact of Q, any voltage up to six times that of the source B may be selected. The arrangement thus provides a convenient voltage multiplier.

The switch Q is connected through a high resistance $R_4$ to the three gaps. The capacity of the condensers $C_1$ to $C_6$ and the high resistance $R_4$ should be chosen so that the time constant RC is some seconds when the switch Q is on the step 6. Thus if, for example, the capacity of each condenser is 2 microfarads and $R_4$ is 40 megohms, the time constant will be about 13 seconds for step 6, and about 80 seconds for step 1.

When making the test, the potentiometer Q will be set to obtain a suitable voltage for the sparks, and the key K is depressed, so that the selected voltage is applied simultaneously to all the gaps. If the part under test is within the limits, the gap $G_1$, being the smallest of the three, breaks down and fires the valve $V_1$ as before, operating the relay A, which locks over the contacts $a4$. At the same time the anode of $V_1$ is transferred to relay C, the valve being extinguished during the change-over, provided the right-hand contact of $a3$ is adjusted to break before the left-hand contact is made. At the same time, contacts $a1$ open and disconnect $G_1$, whereupon the second test is made, and $G_2$ breaks down if the test part is within the limits, firing valve $V_2$ and operating relay B as before. If the test part is too small, $G_3$ breaks down instead of $G_2$, firing the valve $V_1$ again and operating relay C as soon as the contacts $a3$ have changed over. It is in this case immaterial whether the contacts $a1$ break before or after the change-over of $a3$ is completed.

It will be understood that on account of the high time constant of the condenser discharge circuit, the potential of the condensers does not have time to diminish perceptibly in the interval between the two tests, this interval being a small fraction of a second. Thus with this arrangement no second sparking potential has to be separately generated.

The second test thus takes place substantially as in Fig. 1 except that the valve $V_1$ is being used instead of $V_3$, and relay B or C will be operated according as the piece-part is correct or too small. In the case where it is too large, relay B is operated during the first test by the firing of $V_2$ exactly as in the case of Fig. 1, and the second test does not take place at all.

On the completion of the test, contacts $d$ are momentarily opened, as before, to release the circuit.

It will be understood that any number of condensers such as $C_1$ to $C_6$, greater or less than six, may be provided according to the requirements of any particular case, with corresponding numbers of change-over contacts $f$. It will be obvious that these contacts may be (and preferably will be) controlled by several separate relays operated in series or parallel by the key K. Furthermore, the condensers do not necessarily have to be all equal.

If the negative terminal of the battery or source B is earthed, then the contacts $f_1$ are not required, and the left-hand terminal of the condenser $C_1$ can be permanently earthed. The source B could, if desired, be the same as the HT source for the valves.

The arrangement for generating the spark shown in Fig. 1 may obviously be used in Fig. 3 instead of the condensers. Likewise the condenser arrangement of Fig. 3 can be applied to Fig. 1.

The arrangement of Fig. 3 saves a valve and also equalises the use of the two remaining valves, since both are used in both tests. As seen from the foregoing table, for Fig. 1 the valve $V_2$ will tend to be overworked unless the piece-parts tend to be generally too small, which is on the average unlikely; while in the case of Fig. 3, both valves are equally used on the average, assuming there are on the whole equal numbers of rejections for over and under size.

It will be understood that the key K shown in Figs. 1 and 3 is intended to represent any type of contact operated by a relay or sequence switch or like mechanism, or by hand if the system is not automatic.

Figure 2:
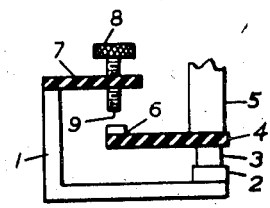
Fig. 2 shows diagrammatically a spark gap test jig suitable for use with either embodiment.

Fig. 2 shows a diagrammatic sketch of a spark-gap test gauging assembly which may be used for $G_2$ in Fig. 1 or 3. It comprises a frame 1 having an anvil plate 2 on which the piece-part 3 under test rests. A horizontal insulating strip 4 is pressed down on the piece-part by a shaft or pillar 5. The strip 4 carries at one end the lower electrode 6 of the spark-gap, and may be a flat disc as shown. Another horizontal insulating strip 7 fixed to the frame carries a screw 8 having at the end a rounded wire tip 9 which serves as the upper electrode of the gap. It will thus be seen that when the thickness of the piece-part 3 increases, the length of the gap decreases by the same amount. A suitable length of gap for a piece-part of average dimension may be obtained by adjusting the screw 8.

Similar gauging assemblies can be used if desired for the gaps $G_1$ and $G_3$, through the facility for inserting a test part is not required. These gaps may be initially adjusted so that selected maximum and minimum piece-parts placed in the jig for $G_2$ are just not rejected. After this they do not need any further adjustment and the piece-parts will be tested by placing them in turn in the gauging assembly either by hand or automatically.

Fig. 2 is only intended to illustrate diagrammatically an arrangement which can be used. Various other gauging assemblies are clearly possible.

It should be added, also, that the gaps $G_1$, $G_2$, and $G_3$ could, if desired, be designed to vary in the same sense as the piece-part. The only difference would be that the smaller gap $G_1$ would be the one corresponding to the miniumum limit and $G_3$ be the maximum; and the terms "too large" and "too small" in the above table giving the operation of the relays would be interchanged.

By the use of a test gauging assembly designed along the lines of Fig. 2, piece-parts of any material may be tested; they do not necessarily have to be metallic.

The current which flows when a spark passes across any of the gaps is extremely small, and may be of the order of a few microamperes according to the values chosen for the resistances in the spark gap circuits. In order to fire the valve it is only necessary to raise the potential of the trigger electrode to the critical value, and the power drawn from the spark gap circuit can be negligible. When the valve fires, a relatively large current may flow to the trigger electrode, but this goes to earth through the resistance connected to the trigger electrode and does not pass through the gap. The consequence of this is that no appreciable burning of the gap electrodes by the sparks occurs, and it has been found that no visible burning effect is produced after continuous operation for several days. Thus the gap dimensions, on which the accuracy of the test depends, are found to vary considerably less in time than do mechanical gauges due to wear.

The three gaps should be arranged near together so that the condition of the air can be assumed to be substantially the same for all, and they should preferably be protected from dust, although no particular trouble attributable to dust has been experienced.

Although the arrangements of Figs. 1 and 3 are intended for checking a dimension with reference to two specified limits, it is evident that by omitting one of the gaps $G_1$ or $G_3$, and the circuit elements associated therewith, a dimension subject only to a maximum or a minimum limit may thereby be checked. Furthermore, by the use of an appropriate gauging assembly some other physical dimension besides a length, such as an angle, could be tested to limits. The term "physical dimension" is therefore not intended to be restricted to length dimensions.

What is claimed is:

1. An electrical device for comparing a physical dimension of an article with a standard physical dimension, including two spark gaps, means for setting the lengths of said gaps respectively corresponding to said physical dimensions, parallel circuit means for applying a sparking voltage simultaneously to said gaps and means for indicating a particular gap across which a spark passes, whereby said first mentioned dimension is checked.

2. An electrical gauging device for testing objects having a predetermined dimension subject to specified maximum and minimum limits, including two fixed spark gaps, the lengths of which are respectively determined by said limits, a test spark gap, means under the control of each of said objects, in turn, for setting the length of said test spark gap in accordance with the magnitude of said dimension of each of said objects, means for applying a sparking voltage to the test gap in parallel with one or the other of the fixed gaps, and means for indicating whether said object is within said specified limits, said indicating means being adapted to be selectively operated in accordance with the particular gaps across which the sparks pass.

3. A device according to claim 2, including also two electron valves operatively associated respectively with said gaps, said valves being so connected and biased as to be initially in a non-conducting condition, and means for rendering one only of the said valves conducting on the passage of a spark across the corresponding gap.

4. A device according to claim 2, including a first electron valve operatively associated with said test gap, a second electron valve and means for associating said second electron valve with each of said fixed gaps in turn, said valves being so connected and biased as to be initially in a non-conducting condition, and means for rendering one only of said valves conducting on the passage of a spark across the gap with which said valve is associated.

5. A device according to claim 2, in which each of said gaps has an individual electron valve operatively associated therewith, all said valves being so connected and biased as to be initially in a non-conducting condition, and means for rendering one only of said valves conducting on the passage of a spark across the corresponding gap.

6. A device according to claim 2, including also two electron valves operatively associated respectively with said gaps, said valves being so connected and biased as to be initially in a non-conducting condition, and means for rendering one only of the said valves conducting on the passage of a spark across the corresponding gap, said electron valves being gas-filled valves and each valve being provided with a trigger electrode, and means whereby said electrode is connected to the corresponding spark gap.

7. A device according to claim 2, including also two electron valves operatively associated respectively with said gaps, said valves being so connected and biased as to be initially in a non-conducting condition, and means for rendering one only of the said valves conducting on the passage of a spark across the corresponding gap, said electron valves being of the cold cathode type.

8. A device according to claim 2, in which said indicating means includes two electron valves operatively associated respectively with said gaps, said valves being so connected and biased as to be initially in a non-conducting condition, and means for rendering one only of the said valves conducting on the passage of a spark across the corresponding gap, including also a plurality of relays corresponding respectively to each one of said gaps, means for connecting each relay in the output circuit of one of said electron valves, when said valve is associated with the gap corresponding to said relay, in such manner that said relay becomes operated on the passage of a spark across said gap, and means controlled selectively in accordance with the condition of operation of each of said relays, whereby each of said controlled means performs a corresponding indicating operation.

9. A device according to claim 2, in which the means for applying said sparking voltage includes an induction coil, a direct current source connected to the primary winding thereof, means for connecting the secondary winding thereof simultaneously to at least two of said spark gaps, and means for predeterminedly interrupting the current in said primary winding.

10. A device according to claim 2, in which the means for applying said sparking voltage includes a condener, means for charging said condenser from a direct current source and means for connecting said condenser to said gaps in such manner as at least partially to discharge said condenser through at least one of said gaps at one time.

11. A device according to claim 2, in which the means for applying said sparking voltage includes a plurality of condensers, means for charging said condensers in parallel from a direct current source, and means for connecting said condensers in series to said gaps in such manner as at least partially to discharge said condensers through at least one of said gaps at one instant.

12. An electrical gauging device for testing the physical dimension of articles with relation to a standard physical dimension with a tolerance determined by maximum and minimum limits including two fixed spark gaps the length of which are respectively determined by said limits, a testing spark gap, means under the control of the article for fixing the length of said test spark gap in accordance with the physical dimension of the article, means for applying a sparking voltage to the test gap in parallel with a first fixed gap and circuit means responsive to closing across said first fixed gap to change over the test gap circuit into parallel relation to the second fixed gap and indicating means energized by the respective gap circuits.

13. An electrical device for sorting objects into groups according to the value of a particular dimension of said objects, including a plurality of fixed spark gaps, the lengths of which are respectively determined by a progressive series of values of said dimensions, a test spark gap, means under the control of said objects, in turn, for setting the length of said test spark gap in accordance with the value of said dimension particular to each object, means for comparing said fixed gaps, in turn with said test gaps, by applying a sparking voltage to said test gap and simultaneously therewith at least in turn to all of said fixed gaps, and means for terminating the test when a spark has tried to pass across said test gap.

HERBERT STEPHENS BISHOP.

REFERENCES CITED

The following references are of record in the file of this patent:

UNITED STATES PATENTS

| Number | Name | Date |
| --- | --- | --- |
| 980,851 | Updegraff | Jan. 3, 1911 |
| 1,350,334 | Radtke | Aug. 24, 1920 |
| 1,982,216 | Lowkrantz | Nov. 27, 1934 |
| 2,312,357 | Odquist | Mar. 2, 1943 |

OTHER REFERENCES

Catalogue sheet entitled "Electromike Comparator Gage," published by Product Development and Engineering Corp. of Cleveland, Ohio, 1937, copy of which is found in Div. 25 of this office, class 209, sub. 88.

"Electronic Micrometer," in Electronics, June 1932, pages 191 and 204, copy found in Div. 25 in Class 209, sub. 88.